United States Patent Office 3,460,565
Patented Aug. 12, 1969

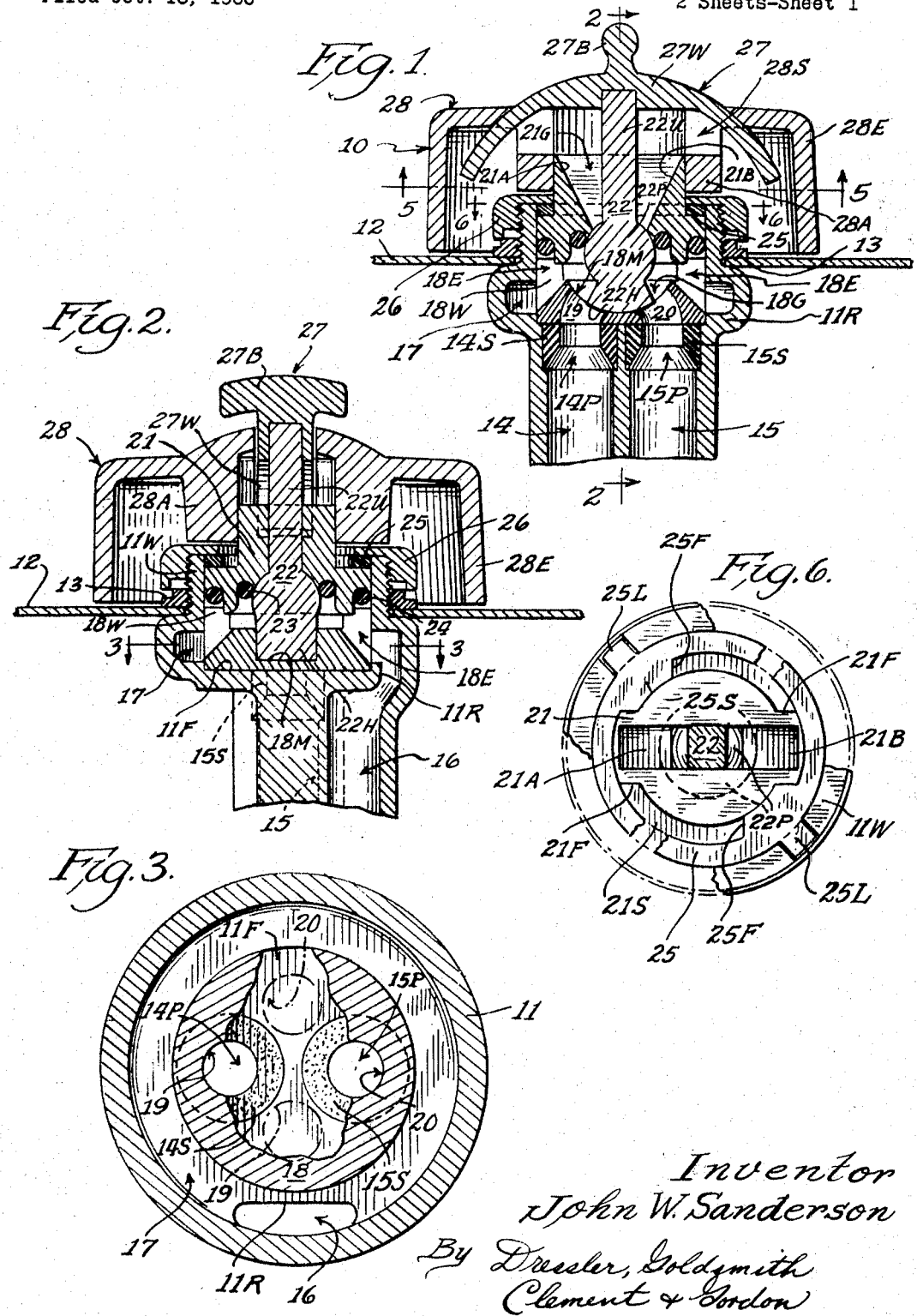

3,460,565
PADDLE VALVE
John W. Sanderson, Delphi, Ind., assignor to Globe Valve Corporation, a corporation of Indiana
Filed Oct. 18, 1966, Ser. No. 587,479
Int. Cl. F16k 11/07, 31/60
U.S. Cl. 137—555                                                20 Claims

ABSTRACT OF THE DISCLOSURE

A mixing valve having a valve body defining inlet ports and composite ported valve means having a first ported valve member seated on the valve body and movable to vary the volume of flow through the inlet ports and a second valve member seated on said first valve member to vary the blend of fluid passing through the ports in said first valve member, and a stem for moving the valve members conjointly and for separately moving the second valve member with respect to the first.

---

This invention relates to a paddle valve and, more particularly, is concerned with a paddle valve arrangement for use as a mixing faucet in kitchens or in lavatory sinks and tubs.

In accordance with the present invention, a valve arrangement is provided wherein a paddle element is mounted in swiveled relation in an end recess of a valve body to regulate on-off flow and mixing flow between a pair of inlet lines and an outlet line. A bonnet carried by the valve body and disposed in the end recess provided a socket for a pivot portion of the paddle. The socket and pivot portion define a center of swiveling movement for the paddle. A stop ring is associated with the bonnet to define limits of rotation thereof in an on-off mode of movement. The paddle is swingable to and fro in a bonnet slot to define limits of paddle travel in a mixing ratio mode of movement.

The inner end of the valve body recess receives a valve seat element having an arcuate guide slot to present a recessed concave seat for sealing cooperation with a matching arcuate contact face on the head of the paddle. The valve seat is provided with separate ports opening into the guide slot and serving as passage extensions of hot and cold inlet lines that extend through the valve body and terminate at a flat ported seat surface defining the base of the valve body recess. The paddle hear is thus swingably movable to and fro in sealing engagement along the guide slot to block either port completely or to block both ports partially to control the mixing ratio of the hot and cold flows The paddle carries a color coded indicator handle which operates in the window area of a hollow knob to expose a color combination representative of the temperature setting of the paddle.

The valve seat element is in the form of a disc rotatably mounted upon the flat ported seat surface at the base of the valve body recess, the ported seat surface being circular and bounded by a guide rim so that the seat can rotate in place for regulating on-off flow. The hollow knob interlocks with the bonnet and with the paddle handle and the paddle interlocks with the valve seat so that rotation of the knob rotates the valve seat, the paddle and bonnet rotating in unison therewith to regulate on-off flow. The valve seat, the bonnet and the paddle form a composite valve unit that is easily removed and replaced in toto or in part to facilitate periodic maintenance and repair operations.

Other features and advantages of the invention will be apparent from the following description and claims and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same:

FIG. 1 is a vertical section through a paddle type mixing faucet constructed in accordance with this invention, the valve, as shown, being set in its on position and at an equal mixing ratio;

FIG. 2 is a vertical section taken on the line 2—2 of FIG. 1;

FIG. 3 is an enlarged horizontal section taken as indicated on the line 3—3 of FIG. 2 and including phantom lines showing the valve off position;

FIG. 6 is a fragmentary plan view illustrating the bonnet and stop washer engagement for automatically registering the assembly of the valve parts and determining limit positions of valve movement.

Figure 4:
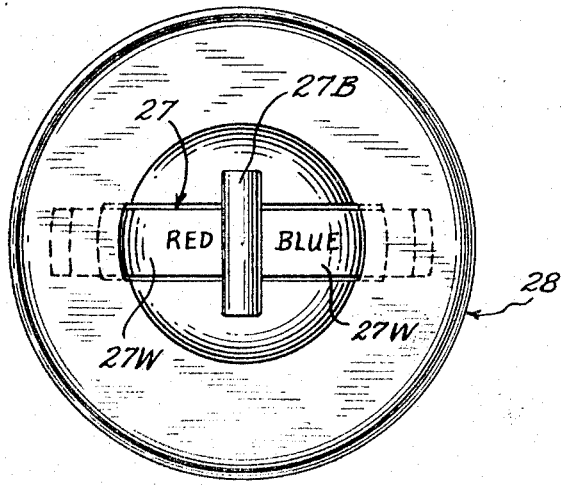
FIG. 4 is a top plan view illustrating a handle structure having a color coding to indicate the instantaneous temperature relationship.
Figure 5:
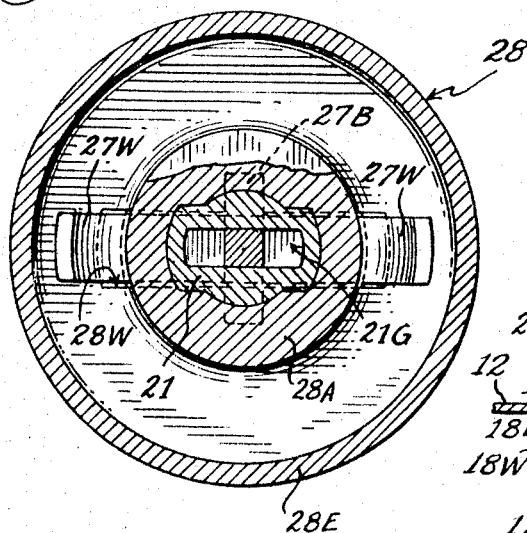
FIG. 5 is a sectional view taken as indicated on line 5—5 of FIG. 1.

Referring now to the drawings, a paddle type mixing faucet, as designated generally at 10, is illustrated in a styling which is suitable for use as a kitchen sink fixture. The fixture includes a stationary fitting 11 to serve as a valve body with a decorative plate or shell 12 being mounted thereon by means such as a lock nut 13. The valve body 11 which may be of cast brass or other suitable material is provided with the usual hot and cold water inlet passages 14 and 15 (FIG. 1) and with an outlet passage 16 (FIG. 2). The valve body 11 has a socket or recess opening through its upper end serving as a valving and mixing chamber 17 through which the incoming water passes in its flow to the outlet passage 16. This recess has a flat circular base wall serving as a fixed valve seat 11F with the inlet passages 14, 15 terminating in spaced inlet ports 14P, 15P that communicate with such seat. An internal rim portion 11R borders the circular seat 11F to guide a disc-type movable valve seat 18 which is positioned in rotatable relation upon the fixed seat.

The movable valve seat has an upstanding peripheral wall 18W provided with a set of radial edge slots 18E communicating with the annular outer region of the mixing chamber 17. A recessed diametral guide slot 18G having a curved bottom wall defining an arcuate valve seat 18M is provided in centrally recessed relation in the movable valve. Curved passages 19, 20 lead through the valve seat from the bottom face to the bottom of the guide slot 18G to serve as passage extensions of the inlet water passages 14, 15 and to provide ports communicating with the arcuate valve seat 18M.

The movable valve seat 18 is illustrated in FIGS. 1, 2 and 3, in its valve open position wherein the disc passages 19, 20 are in full registry with the inlet ports 14P, 15P opening through the fixed valve seat 11F provided in the base of the valve body recess. Each port 14P, 15P is at a slightly enlarged passage region and a rubber-like seal sleeve 14S, 15S is force fit therein to be self biasing against the movable seat 18. Liquid flow is upwardly through the disc 18 and then radially outwardly through its edge slots 18E and into the annular mixing chamber 17 which directs the flow to the outlet 16. As is explained hereinafter, the movable valve seat 18 is rotatable through about 90° on its fixed valve seat 11F to bring the disc passages 19, 20 to a position (as shown in phantom lines in FIG. 3)

out of registry with the ports 14P, 15P and block flow through the valve.

A bonnet 21 is received in the valve body recess and has a central vertical throughpassage to mount a paddle element 22. A central underface region of the bonnet defines a downwardly facing socket of parti-spherical contour bordering the throughpassage for swivel mounting of the pivot portion 22P of the paddle. The upper region of the throughpassage is laterally flared to determine a sector shaped guide slot 21G for the upper or stem end 22U of the paddle. The bonnet 21 includes a depending annular rib 21R projecting into an inner edge notch in the wall 18W and serving as guide and seat structure for inner and outer O-ring seals 23, 24 that establish a top seal between the paddle and the bonnet and between the bonnet and the end wall 11W of the valve body.

The paddle 22 terminates in a valve head portion 22H projecting into the recessed guide slot 18G and presenting an arcuate contact face matched to the valve seat 18M and swingbly movable to and fro in sealing engagement along the guide slot. In the position illustrated in FIG. 1, the paddle head 22H partially blocks each of the passages 19, 20. The paddle stem 22U is swingable to either side of the center position to move through the bonnet guide slot 21G which has flaring end walls 21A and 21B serving as limit stops to determine paddle positions wherein the paddle head completely blocks one of the disc passages 19, 20 and leaves the other disc passage completely open.

The bonnet 21 has an enlarged lower end of circular outline and a reduced upper end of generally circular outline but including edge lugs 12F presenting radial abutment faces (see FIG. 6). The stepped relationship between these upper and lower ends of the bonnet provides an upwardly facing shoulder 21S on which a lock ring 25 is seated. The lock ring 25 has outwardly projecting lugs 25L engageable in edge notches provided in the valve body end wall 11W to register and retain the lock ring in predetermined position. The lock ring has inwardly directed sections 25S presenting radial abutment faces 25F to engage with the radial abutment faces 21F and determine opposite extremes of rotary movement of the bonnet 21 within the valve body recess. Approximately 90° of bonnet rotation is provided.

A retainer cap 26 is threaded onto the upper end wall 11W and loads the lock ring 25 against the bonnet 21 which in turn load the paddle 22 against the movable valve seat which is held in sealing relation to the seal sleeves in the fixed valve seat. The bonnet, paddle and movable valve seat form a composite valve unit which is conveniently removable and replaceable. The parts of this composite valve unit may be of molded plastic such as Teflon or nylon for minimizing friction and maximizing ease of valve actuation.

The actuating mechanism as herein illustrated includes an indicator handle 27 movably nested within a hand knob 28. The indicator handle 27 is of a domed configuration and has a central boss 27B which is internally socketed to seat upon the paddle, with the curved wing portions 27W leading oppositely from the boss 27B. The hand knob 28 has a depending interior wall 28A defining a socket that mates with the upper end of the bonnet and a depending exterior wall 28E serving as a skirt or shield for the upper end of the valve body. The hand knob 28 has a generally rectangular window 28W extending centrally across its top and the interior wall 28A has spaced guide slots 28S underlying opposite extremities of the window and accommodating insertion of the handle into nested relation within the knob, with wing portions visible through the window being colored red and blue as illustrated in FIG. 4 to provide a temperature indication.

The actuator assembly is engaged upon the composite valve unit by socketing the boss 27B onto the paddle 22 and socketing the interior wall 28A onto the bonnet. Rotation of the hand knob 28 directly rotates the bonnet and concurrently rotates the handle 27, the paddle 22 and the movable valve seat 18 so that all parts move in unison and control on-off flow relationships. Swinging movement of the hand knob 27 swings the paddle 22 to regulate the mixing ratio. The domed portions of the hand knob lie in and move in a spherical travel path which is centrally framed by the window so that when an equal mixing ratio is set, equal regions of red and blue are apparent. When the handle is set towards wall 21A to open cold water passages 14 and 19, the blue region is fully exposed and when the handle is set towards wall 21B to open hot water passages 15 and 20 the red region is fully exposed.

Figure 7:
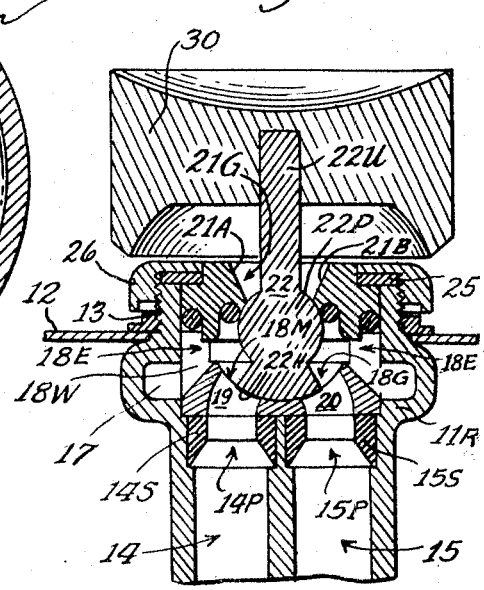
FIG. 7 is a fragmentary vertical section of an alternative embodiment showing a single hand control for the paddle valve.

Another embodiment is illustrated in FIG. 7 wherein a single knob 30 socketed directly and only to the paddle stem 22U is effective for controlling both mixing ratio and volume flow relationships. The knob 30 may be socketed in splined relation or secured by a set screw to rotate in unison with the paddle 22.

Turning the knob 30 in the conventional fashion rotates the paddle 22, the bonnet 21 and the movable valve seat 18 in unison to regulate flow volume in accordance with the degree of registry of the passages 19, 20 with the ports 14P, 15P. Tilting of the knob 30 to swivel the paddle 22 in the bonnet socket swings the paddle head 22H to various ratios of registry with the passages 19, 20 to regulate the ratio of flow through each such passage.

What is claimed is:

1. In a mixing valve, valve body means having a recess provided with an arcuate seat facing outwardly from an interior region thereof, separate inlet port means communicating with spaced regions of said seat and outlet port means communicating with said recess outwardly of said seat, a bonnet rotatably mounted in said recess and providing a socket spaced from and facing generally towards said seat, and a paddle valve projecting through said bonnet and keyed to said bonnet for corotation of said bonnet and said paddle valve and having an intermediate pivot swiveled in said socket and having an end head sealingly engageable in shiftable relation with said seat to regulate the mixing ratio of said inlet port means in accordance with the pivot position occupied by the head, said paddle valve having stem means connected thereto for rotation of said bonnet and paddle valve in said valve body.

2. In a mixing valve in accordance with claim 1 and wherein said stem means carries an external handle, a shield is disposed in masking relation to the valve body and has a central window guidingly receiving said handle, said handle presenting a surface partly visible through said window and color coded with respect to the position of the head to indicate the temperature corresponding to the paddle valve position.

3. In a mixing valve in accordance with claim 1 in which said bonnet defines a guide slot, said stem means being received therein for slidable movement therein only whereby when said stem is rotated said bonnet and said stem corotate and when said stem is slid in said guide slot, said paddle valve slidably shifts with respect to said guide slot.

4. In a mixing valve, valve body means having a recess provided with an arcuate seat facing outwardly from an interior region thereof, separate inlet port means communicating with spaced regions of said seat and outlet port means communicating with said recess outwardly of said seat, a bonnet disposed in said recess and providing a socket spaced from and facing generally towards said seat, and a paddle valve projecting through said bonnet and having an intermediate pivot swiveled in said socket and having an end head sealingly engageable in shiftable relation with said seat to regulate the mixing ratio of said inlet port means in accordance with the pivot position occupied by the head, said valve body means having a planar fixed seat defining the base of said recess and having separate inlet ports at spaced regions thereof and said valve body means including a movable valve seat rotatable in sealing relation against the fixed valve seat and in the plane thereof, said movable valve seat having corresponding passage extensions communicating with spaced regions of said arcuate seat and providing, in one rotary position of said movable seat, concurrent registry and providing, in another rotary position of said movable seat, concurrent non-registry with said separate inlet ports and means externally engageable with said paddle for rotating the paddle, the bonnet and the movable valve seat in unison.

5. In a mixing valve in accordance with claim 4 and wherein said bonnet has a non-circular outer end bordered by an outwardly facing generally annular intermediate shoulder, and a lock ring seats on said shoulder and has external lug means interlocking with said valve body means, said lock ring having a non-circular internal periphery mating with the outer end of said bonnet to allow a predetermined range of rotary movement of said bonnet in accordance with said rotary positions of the movable seat.

6. In a mixing valve, valve body means having a recess provided with an arcuate seat facing outwardly from an interior region thereof, separate inlet port means communicating with spaced regions of said seat and outlet port means communicating with said recess outwardly of said seat, a bonnet disposed in said recess and providing a socket spaced from and facing generally towards said seat, and a paddle valve projecting through said bonnet and having an intermediate pivot swiveled in said socket and having an end head sealingly engageable in shiftable relation with said seat to regulate the mixing ratio of said inlet port means in accordance with the pivot position occupied by the head, and wherein said valve body means has a fixed flat circular seat bordered by a peripheral rim and defining the base of said recess, said flat seat having separate inlet ports at spaced regions thereof, and said valve body means including a movable valve seat guidingly encircled by said rim and rotatable in sealing relation against the flat seat and in the plane thereof, said movable valve seat having a recessed groove providing a concave bottom surface facing towards said bonnet and defining said arcuate valve seat, said movable valve seat having corresponding passage extensions communicating with spaced regions of said arcuate valve seat and providing, in one rotary position of said movable seat, concurrent registry and providing, in another rotary position of said movable seat, concurrent non-registry with said separate inlet ports, said paddle head being convex and matched to said recessed groove to be swingable in sealing relation therealong during swivel movement of said paddle, and means externally engageable with said paddle for rotating the paddle, the bonnet and the movable valve seat in unison.

7. In a flow through valve, a valve body having a recess provided with a planar seat facing outwardly from an interior region thereof, flow passage means leading through said valve body and including a pair of inlet ports communicating with said seat and said recess, a valve having a planar face spanning said seat and rotatably engaging the same to move in the plane of said seat to regulate the volume of flow through said pair of inlet ports, means for restricting the movement of said valve face to oscillation about an axis normal to said planar face, a bonnet disposed in said recess and providing a socket spaced from and confronting said valve, and a paddle element projecting through said bonnet, said paddle element having an intermediate pivot portion swiveled in said socket and having an end head portion mechanically interlocking with said valve to rotate in unison with said valve in the plane of said seat while said valve is held in sealing relation upon said seat.

8. In a mixing valve in accordance with claim 7 and including releasable retaining means engaged upon said valve body for holding said bonnet in confronting relation to said valve correspondingly to hold said paddle element in mechanical interlock relationship with said valve.

9. In a mixing valve in accordance with claim 7 and wherein said bonnet has a non-circular outer end bordered by an outwardly facing generally annular intermediate shoulder, and a lock ring seats on said shoulder and has external lug means interlocking with said valve body, said lock ring having a non-circular internal periphery mating with the outer end of said bonnet to allow a predetermined range of rotary movement of said bonnet.

10. In a mixing valve, means including cooperating stationary and movable valve parts for controlling volume and mixing flow ratios between a pair of inlets and an outlet, an elongated paddle element connected to a movable valve part and rotatable in a first mode about a lengthwise axis and swingable in a second mode about a center of rotation defined by and between said parts and lying on said axis, a shield disposed in external surrounding relation to the paddle to rotate in unison therewith and having a central window, and a dome-like indicator handle fixed on said paddle element and movable therewith to generate a spherical surface travel path which is centrally framed by said window, said handle presenting a surface partly visible through said window and color coded with respect to the position of the paddle element to indicate temperature in accordance with the paddle element position.

11. In a mixing valve in accordance with claim 10 and wherein said shield has a depending internal wall provided with aligned slots at opposite extremities of said window and wherein said indicator handle has an upstanding central knob external of said shield and oppositely curving color coded wings intersecting the window and projecting through said aligned slots.

12. In a mixing valve in accordance with claim 4 and wherein the paddle engaging means comprises a single knob rotatable about a lengthwise axis through said paddle for correspondingly moving the paddle, the bonnet and the movable valve seat in unison, said knob being swingable bodily with said paddle to swivel said pivot in said socket and regulate registry of said head with said passage extensions.

13. In a mixing valve, a valve body defining a valve seat having a pair of inlet ports and defining a recess having an outlet port, a valve means, said valve means comprising a first valve member seated on said valve seat and defining a pair of passages adapted to be moved into and out of flow communication with said inlet ports to vary the volume of flow through said inlet ports, said first valve member defining a second valve seat spaced from said first valve seat and in flow communication with said pair of passages and with said recess, a second valve member seated on said second valve seat adapted to be moved into and out of sealing engagement with said passages to proportion the flow through said passages to said recess and said outlet port, and means interconnecting said valve members for movement of said members conjointly with respect to said first valve seat without movement of said second valve member with respect to said second valve seat and for movement of said second valve member without movement of said first valve member with respect to said first valve seat.

14. In a mixing valve of claim 13 in which said interconnecting means comprises a slot in said first valve member adjacent said second valve seat and said second valve member projects into said slot for sliding movement therein and with respect to said second valve seat.

15. In the mixing valve of claim 14 in which said slot is concave and in which the second valve member defines a mating convex face portion.

16. In the mixing valve of claim 13 in which said first valve seat is flat and said first valve member defines a comlementary flat face portion adapted to rotate on said first valve seat to move said passages into and out of flow communication with said inlet ports.

17. In the mixing valve of claim 16 in which said valve means and valve body define means for limiting the relative rotation of said first valve member and first valve seat to about 90°.

18. In the mixing valve of claim 13 in which said interconnecting means comprises a bonnet and a valve stem projecting therethrough, said valve stem being co-rotatably secured to and being oscillative on said bonnet.

19. In the mixing valve of claim 13 in which said valve means further comprises a stem projecting from said valve body, for moving said valve members, and means for limiting the movement of said stem.

20. In the mixing valve of claim 19 in which said limiting means limit the movement of said valve members with respect to their respective valve seats.

References Cited

UNITED STATES PATENTS

| | | |
|---|---|---|
| 2,020,286 | 11/1935 | Bittle. |
| 2,977,986 | 4/1961 | Hinderer et al. __ 137—625.4 X |
| 3,238,968 | 3/1966 | Pecis _____ 137—556 |
| 3,250,296 | 5/1966 | Perlman _____ 137—625.4 |
| 3,254,669 | 6/1966 | Perlman _____ 137—636.3 X |

M. CARY NELSON, Primary Examiner

MICHAEL O. STURM, Assistant Examiner

U.S. Cl. X.R.

137—636, 637

PO-1050
(5/69)

UNITED STATES PATENT OFFICE
CERTIFICATE OF CORRECTION

Patent No. 3,460,565        Dated August 12, 1969

Inventor(s)    John W. Sanderson

It is certified that error appears in the above-identified patent and that said Letters Patent are hereby corrected as shown below:

Column 1, line 32, "provided" should be -- provides --;
column 1, line 47, "hear" should be -- head -- .

SIGNED AND
SEALED

OCT 21 1969

(SEAL)
Attest:

Edward M. Fletcher, Jr.
Attesting Officer

WILLIAM E. SCHUYLER, JR.
Commissioner of Patents